(12) United States Patent
Lewellen

(10) Patent No.: US 11,598,450 B2
(45) Date of Patent: Mar. 7, 2023

(54) PIPE LAYING APPARATUS AND METHOD FOR LAYING A PIPELINE

(71) Applicant: JT Lewellen, Houston, TX (US)

(72) Inventor: JT Lewellen, Houston, TX (US)

( * ) Notice: Subject to any disclaimer, the term of this patent is extended or adjusted under 35 U.S.C. 154(b) by 0 days.

(21) Appl. No.: 17/557,054

(22) Filed: Dec. 21, 2021

(65) Prior Publication Data
US 2022/0213982 A1 Jul. 7, 2022

Related U.S. Application Data

(60) Provisional application No. 63/134,513, filed on Jan. 6, 2021.

(51) Int. Cl.
*F16L 1/036* (2006.01)
*F16L 1/06* (2006.01)
*F16L 1/10* (2006.01)

(52) U.S. Cl.
CPC ............ *F16L 1/065* (2013.01); *F16L 1/036* (2013.01); *F16L 1/10* (2013.01)

(58) Field of Classification Search
CPC . F16L 1/028; F16L 1/032; F16L 1/036; F16L 55/18
USPC ............ 405/183.5, 184.184, 1, 184.2, 184.3, 405/184.4, 174; 254/29 R; 414/745.5
See application file for complete search history.

(56) References Cited

U.S. PATENT DOCUMENTS

| | | | | |
|---|---|---|---|---|
| 2,333,208 A | * | 11/1943 | Spear | B66C 1/14 405/174 |
| 2,780,376 A | * | 2/1957 | Sanders | A01G 25/09 414/745.9 |
| 3,969,905 A | * | 7/1976 | Dolza | F16L 1/036 414/746.4 |
| 2016/0091113 A1 | * | 3/2016 | Weigand | F16L 1/065 405/175 |

FOREIGN PATENT DOCUMENTS

CN 111994800 A * 11/2020

* cited by examiner

*Primary Examiner* — Sunil Singh
(74) *Attorney, Agent, or Firm* — Karen B. Tripp

(57) ABSTRACT

An apparatus and method for laying pipe in a ditch. The apparatus comprises a mobile platform having a longitudinal central axis. A support extends from the mobile platform and includes a cradle. The cradle supports a weight of a pipe segment in alignment with the central longitudinal axis of the mobile platform as the pipe laying apparatus transports the pipe segment to a location where the pipe segment is to be placed and as the pipe laying apparatus offloads the pipe segment at the location where the pipe segment is to be placed in the ditch.

19 Claims, 12 Drawing Sheets

PIPE LAYING APPARATUS AND METHOD FOR LAYING A PIPELINE

RELATED PROVISIONAL APPLICATION

This application claims the benefit of U.S. Provisional Patent Application Ser. No. 63/134,513, filed Jan. 6, 2021, and entitled "Pipe Laying Apparatus and Method for Laying a Pipeline" which is incorporated herein by reference in its entirety.

BACKGROUND INFORMATION

1. Field

The present disclosure relates generally to pipeline installation of pipelines comprised of mid-sized and large-sized pipes for carrying fluids, such as, for example, hydrocarbon oil and derivatives, chemical products, and water, which according to their application are designated as oil pipelines, gas pipelines, aqueducts. More specifically, the present disclosure relates to a pipe laying apparatus and method for transporting and laying pipe segments within a trench or ditch.

2. Background

Pipelines can be used for distributing natural gas and other fluids such as hydrocarbon oil and derivatives, chemical products, and water. The pipelines are comprised of many lengths of individual pipe segments. The pipe segments are typically manufactured off-site, transported to an installation site, assembled into longer pipeline sections on site, and then moved to and installed at a desired location, often within a ditch. The longer pipeline sections can then be joined together, while in place in the ditch, to assemble the entire pipeline.

Typical pipe segments can be used in oil pipelines, gas pipelines, aqueducts, sewers, and other types of conduits. These pipe segments can have a diameter, for example, in the range of 4 to 48 inches and a length, for example, in the range of 20 to 40 feet. Dimensions of the pipe segments are designed according to the intended use of the assemble pipeline. Because of the relatively large size of pipe segments and assembled pipe sections, it is often difficult to safely transport and position the pipe segments or assembled pipe sections into place at a desired location within a ditch or trench. Further, environmental, geographical, and weather constraints must be overcome.

Once on site, large, heavy equipment, for example, "side booms," are traditionally considered necessary to transport the pipe segments and lay the pipe segments into place in the ditch. The side booms are a large tractor type vehicle which carry the pipe segments at the end of a boom or arm. The boom, or arm, extends off a lateral side of the vehicle while counterweights, to offset the weight of the pipe segments and the boom, are attached to the opposite lateral side of the vehicle. The side boom vehicle, or a series of side booms, then traverses alongside of the ditch carrying lengths of pipe hanging off to one side of the vehicle. After reaching a desired location along the side of the ditch, the side boom then lowers the pipe segment down into the ditch. Caution is required to not tip the side boom vehicle over or drop the pipe segment from too much of a height in order to avoid damage to the pipe segment. Often, human skilled crew are required to be dangerously positioned near the side booms to help direct the pipe segments off the side boom and into a desired position within the ditch. The procedure is time consuming and use of numerous side booms can be costly.

Therefore, it would be desirable to have a method and apparatus that takes into account at least some of the issues discussed above, as well as other possible issues.

SUMMARY

An illustrative example of the present disclosure provides a pipe laying apparatus comprising a mobile platform having a central longitudinal axis. A support extends from the mobile platform and a cradle is attached to the support. The cradle is configured to support a pipe segment and align the weight of the pipe segment with the longitudinal axis of the mobile platform. The weight of the pipe segment is aligned with the central longitudinal axis of the mobile platform as the pipe laying apparatus transports the pipe segment to a location and as the pipe laying apparatus offloads the pipe segment at the location.

Another illustrative example of the present disclosure provides a system for laying a pipeline in a ditch. The system comprises pipe delivery equipment configured to feed a pipe segment to a pipe laying apparatus while the pipe laying apparatus is positioned in the ditch. The pipe laying apparatus comprising a mobile platform having a longitudinal central axis. A plurality of supports extends from the mobile platform and a cradle is attached to each support of the plurality of supports. Each cradle is configured to support the pipe segment and align a weight of the pipe segment with the longitudinal central axis of the mobile platform. The pipe laying apparatus is configured to transport the pipe segment to a location within the ditch and to offload the pipe segment at the location.

A further illustrative example of the present disclosure provides a method of laying pipe in a ditch. The method comprising supporting a pipe segment on a mobile platform. The mobile platform has a central longitudinal axis and a weight of the pipe segment is aligned with the central longitudinal axis. Moving the mobile platform to a position where the pipe segment is to be laid while maintaining the position of the weight of the pipe segment aligned with the central longitudinal axis. Moving the pipe segment off the mobile platform as the mobile platform moves away from the position where the pipe segment is to be laid while maintaining the position of the weight of the pipe segment aligned with the central longitudinal axis.

The features and functions can be achieved independently in various illustrated examples of the present disclosure or may be combined in yet other illustrated examples in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more considerations. For example, the illustrative embodiments recognize and take into account that transporting large pipe segments typically used to assemble oil or gas pipelines, aqueducts, or sewer systems is time consuming and costly as a result of the requirement for oversized transportation vehicles.

The illustrative embodiments also recognize and take into account that the transportation vehicles carry the large pipe segments at the end of a boom extending from a side of the transportation vehicle and that the transportation vehicle further requires counterweights on the opposite side of the vehicle to offset the weight of the pipe segment being transported.

The illustrative embodiments also recognize and take into account that the transportation vehicles also need to be capable of offloading a pipe segment that has been transported to a desired pipeline location from the vehicle down into a ditch that is typically positioned well below the vehicle's elevation which could result in the tipping over of the transportation vehicle and that safety hazards exist for necessary human skilled crew positioned near the transportation vehicles and in the ditch during offloading.

Thus, the illustrative embodiments provide a pipe laying apparatus and method of laying pipe that allows for programmable movement of pipe segments with remote controlled mobile platforms. The remote controlled mobile platforms reduce the need for human skilled crew positioned in harm's way during transportation and offloading of the pipe segments. The mobile platforms travel within the ditch or beside the ditch to which the pipe segment is to be placed. Cradles attached to the mobile platform support the weight of the pipe segment in alignment with the central longitudinal axis of the mobile platform thereby significantly reducing the likelihood of tipping over and increasing the safety of any human skilled crew. The weight of the pipe segments is not carried to the side of a vehicle as is done with a "side boom" vehicle. The mobile platforms may also straddle the ditch while travelling on both banks of the ditch simultaneously while still supporting the weight of the pipe segments in alignment with the central longitudinal axis of each mobile platform. The mobile platforms further provide a ramp through which the pipe segment can be moved down along and gently placed into position in the ditch thereby significantly reducing the possibility of damage to the pipe segment. The illustrative embodiments can also be employed when transporting and offloading pipe segments for use in horizontal directional drilling.

Figure 1:
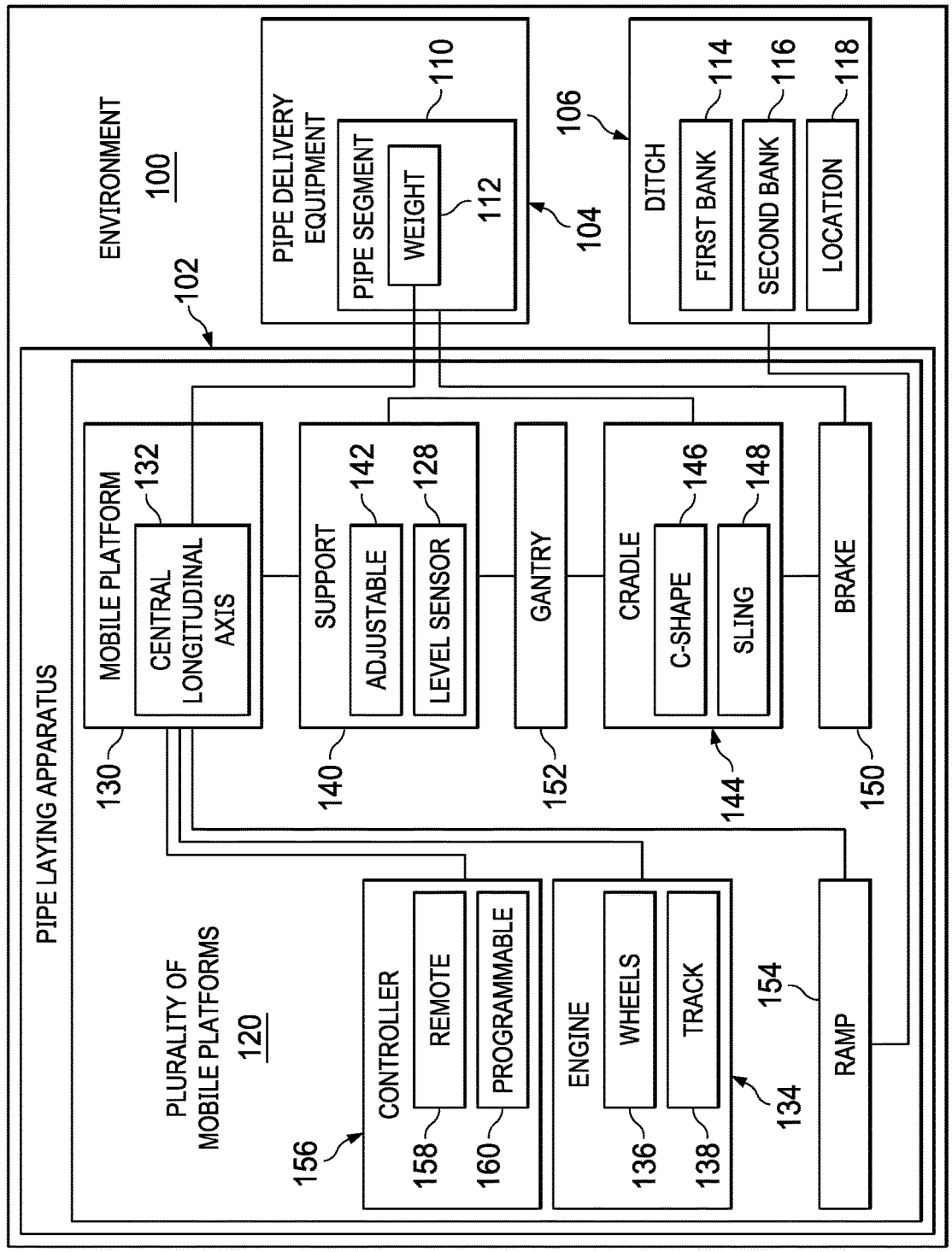
FIG. 1 is an illustration of a block diagram of an environment in accordance with an illustrative example.

With reference now to the figures and, in particular, with reference to FIG. 1, an illustration of a block diagram of an environment is depicted in accordance with an illustrative example. Environment 100 depicts an environment where the illustrative examples can be implemented generally. Environment 100 includes pipe laying apparatus 102, pipe delivery equipment 104, and ditch 106 in this illustrative example.

In this illustrative example, pipe segment 110 is to be transported to and laid in ditch 106 by pipe laying apparatus 102. Pipe segment 110 has weight 112. Ditch 106 includes a first bank 114 and a second bank 116. Ditch 106 also includes location 118. Location 118 is where pipe segment 110 is to be transported to and put into position. Pipe laying apparatus 102 receives pipe segment 110 from pipe delivery equipment 104, transports pipe segment 110 to location 118, and places pipe segment 110 in ditch 106 at location 118.

Pipe laying apparatus 102 includes plurality of mobile platforms 120. Plurality of mobile platforms 120 includes at least one of mobile platform 130. While mobile platform 130 can be used to transport and place a single pipe segment, plurality of mobile platforms, aligned in series, can be used to transport several joined pipe segments at the same time.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Mobile platform 130 transports and lays down, places pipe segment 110 in ditch 106 at a desired location 118. Mobile platform 130 has a central longitudinal axis 132. Central longitudinal axis 132 can be defined as the linear axis positioned equidistant from the two lateral sides of mobile platform 130.

Mobile platform 130 receives its power to be mobile from engine 134. Engine 134 can be designed to operate on diesel fuel, gasoline, electrical batteries, etc. Engine 134 can power, for example, set of wheels 136 or tank track 138.

Support 140 is attached to and extends from mobile platform 130. Mobile platform 130 can include more than one support 140. Each support 140 is extensible, for example via hydraulics or hydraulic cylinders, such that the length of each support 140 is adjustable 142. Level sensor 128 senses the horizontal position of mobile platform 130 as mobile platform 130 traverses the ground. If the ground is uneven, level sensor 128 can send signals to support 140 or multiple supports and adjust the extension length of each support such that a pipe segment supported by cradles on the supports stays horizontally level despite uneven terrain that the mobile platform may be traversing.

Cradle 144 is attached to support 140. Because support 140 is extensible, the distance cradle 144 extends from mobile platform 130 is adjustable. Cradle 144, for example, can be a C-shaped 146 bracket or a flexible sling 148. Mobile platform 130 supports pipe segment 110 with cradle 144. Cradle 144 is configured to align weight 112 of pipe segment 110 with longitudinal central axis 132 as pipe laying apparatus 102 transports pipe segment 110 to location 118 and as pipe laying apparatus 102 offloads pipe segment 110 at location 118. The position of the cradle, in relation to the mobile platform, is adjustable because the length of each support is adjustable. Cradles can be replaced by baskets secured to mobile platform 130 for carrying tools and other equipment in environment 100.

Mobile platform 130 includes brake 150. Brake 150 secures pipe segment 110 to cradle 144. Alternatively, brake 150 can secure pipe segment to any other portion of mobile platform 130. Ultimately, brake 150 secures pipe segment 110 to prevent movement of pipe segment 110 relative to mobile platform 130.

Mobile platform can include gantry 152. Gantry 152 can be attached to support 140 and cradle 144, shaped as flexible sling 148, can hang from gantry 152. The presence of gantry 152 does not alter the purpose of cradle 144. Cradle 144 is configured to align weight 112 of pipe segment 110 with longitudinal central axis 132 as pipe laying apparatus 102 transports pipe segment 110 to location 118 and as pipe laying apparatus 102 offloads pipe segment 110 at location 118 whether cradle 144 is directly attached to support 140 or hangs from gantry 152.

Ramp 154 is attached to mobile platform 130. Ramp 154 extends from mobile platform 130 to a floor of ditch 106. When offloading pipe segment 110 from mobile platform 130, pipe segment slides down ramp 154 until in contact with the floor of ditch 106 at the desired location 118. Ramp 154 includes a low-friction surface. The low-friction surface of ramp 154 can be lubricated or can include rollers or slides.

The operations of mobile platform 130, engine 134, support 140, brake 150, and ramp 154 can be managed by controller 156. Controller 156 can be remote 158 controlled and can be programmable 160. In an illustrative example, controller 156 can be programmed to position mobile platform 130 or each mobile platform of plurality of mobile platforms 120 according to specific parameters of environment 100. For example, each mobile platform of plurality of mobile platforms 120 can be programmed to move into position based on size and weight of pipe segment 110, length and depth of ditch 106, or number of mobile platforms in use in the environment. The position of mobile platform 130 or each mobile platform of plurality of mobile platforms 120 or each mobile platform of plurality of mobile platforms 120 relative to each other mobile platform of plurality of mobile platforms 120 is important to control sag of the pipe segments being transported and to prevent damage to the pipe segments.

Controller 156 includes an antenna which may enable a user to drive each mobile platform with a remote controller. Controller 156 can also control signals sent from level sensor 128 to support 140. Controller 156 can be implemented, for example, as custom circuitry, as a hardware processor executing programmed instructions, or some combination thereof.

Any of the various control elements shown in the figures or described herein can be implemented in a number of different ways. These control elements can be at least one of an electrical component or an electronic component. An example of a control element is controller 156 in FIG. 1.

The controller elements shown in the figures or described herein can be implemented as hardware, a processor implementing software, a processor implementing firmware, or some combination of these. For example, an element can be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Figure 2:
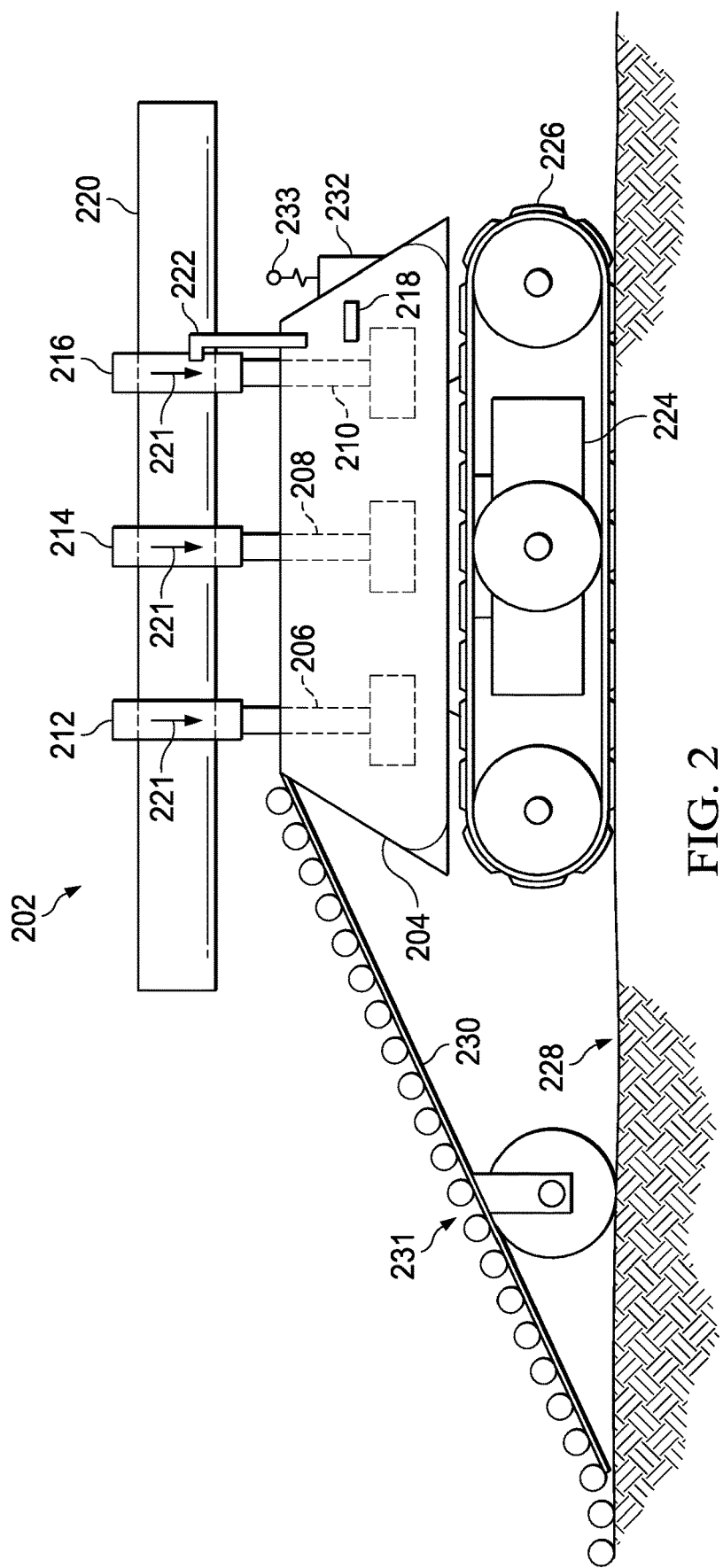
FIG. 2 is an illustration of a pipe laying apparatus in a ditch in accordance with an illustrative example.

With reference next to FIG. 2, an illustration of a pipe laying apparatus is depicted in accordance with an illustrative example. In this illustrative example, pipe laying apparatus 202 is an example of one implementation for pipe laying apparatus 102 shown in block form in FIG. 1.

Figure 4:
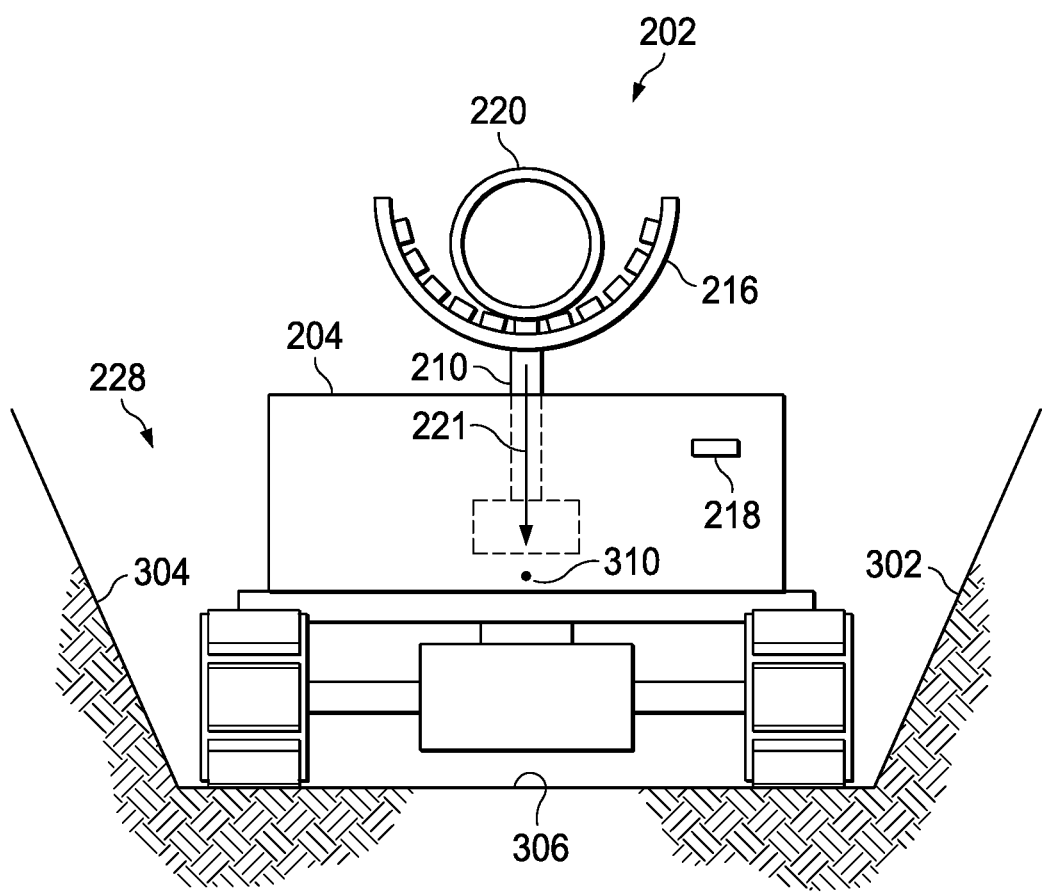
FIG. 4 is an illustration of an end view of a pipe laying apparatus in a ditch in accordance with an illustrative example.

As depicted, pipe laying apparatus 202 includes mobile platform 204. Support 206, support 208, and support 210 extend from mobile platform 204. Cradle 212 is attached to support 206. Cradle 214 is attached to support 208. Cradle 216 is attached to support 210. As depicted, three separate supports are shown. It is understood that additional or fewer supports/cradles could be utilized with adequate success. Each support is extensible, for example, via hydraulics or hydraulic cylinders. Because the cradle is attached to the distal end of the support, the distance of the cradle from the mobile platform 204 is adjustable. The cradles, for example, cradle 212, cradle 214, and cradle 216 support pipe segment 220. In other words, mobile platform 204 supports weight 221 of pipe segment 220. Weight 221 is represented in FIGS. 2 and 4 with arrows. Each cradle may be, for example, C-shaped or horseshoe shaped to conform to the generally cylindrical shape of pipe segment 220.

Each cradle can include a low-friction surface such as rollers or lubrication in order to facilitate movement of pipe segment 220 through each cradle. As a result, pipe segment 220 is free to move relative to the cradles and mobile platform 204 unless restrained in some manner. Brake 222 attached to mobile platform 204 and/or at least one of the cradles secures pipe segment 220 relative to mobile platform 204. When brake 222 is engaged, pipe segment 220 is no longer free to move relative to the cradles or mobile platform 204.

Engine 224 and track 226 combine to provide mobility for mobile platform 204. Engine 224 provides power for track 226. Track 226 contacts ditch 228. Engine 224 can be powered by diesel fuel, gasoline, hydrogen, other green fuels, electrical batteries, etc. or any combination thereof. Track 226 can be replaced with a set of wheels, treads, or skids or any combination thereof.

Ramp 230 is attached to mobile platform 204. Ramp 230 extends from mobile platform 204 to a floor of ditch 228. Ramp 230 includes low-friction surface 231. Low-friction surface 231 of ramp 230 can be a lubricated surface or, for example, may include rollers, slides, etc. For example, rollers can include ball bearings or cylindrical shaped rollers. Cylindrical shaped rollers can have a diameter in the range of, for example, 1 to 12 inches. Larger or smaller diameters are also contemplated. Low-friction surface 231 further includes bumpers or a V-shaped surface to direct the pipe segment to the longitudinal middle of ramp 230. Ramp 230 can also include a wheel attached to the underside of ramp 230. The wheel supports the weight of the ramp and a pipe segment should a pipe segment be in the process of offloading from the mobile platform. The wheel is sized such that it vertically positions the end of the ramp proximate the floor of ditch 228. The wheel can include a wiper. The wiper would rub the wheel to remove mud, clay, or dirt that could possibly collect on the wheel.

Controller 232, mounted on or within mobile platform 204, is in electrical communication with mobile platform 204. Controller 232 can be programmed by a user through the use of a remote computer or direct wired computer. The operation of mobile platform 204, engine 224, supports 206, 208, 210, and brake 222 can be managed by controller 232. To manage the aforementioned components means to send signals from a processor to servos or other mechanical component to effect movement in the mobile platform 204, engine 224, supports 206, 208, 210, and brake 222. Through controller 232, mobile platform 204 can be remote controlled and the movement of mobile platform 204 can be programmable. In an illustrative example, controller 232 can be programmed to position mobile platform 204 or each mobile platform of a plurality of mobile platforms according to specific parameters of ditch 228 and pipe segment 220. For example, each mobile platform can be programmed to move into position based on size and weight of pipe segment 220, length and depth of ditch 228, or number of mobile platforms in use in the ditch. The position of mobile platform 204 relative to another mobile platform during operation of laying pipe segments in the ditch is important in order to control sag of the pipe segments being transported and to prevent damage to the pipe segments.

Controller 232 includes antenna 233 which may enable a user to drive each mobile platform with a remote controller. Controller 232 can be implemented, for example, as custom circuitry, as a hardware processor executing programmed instructions, or some combination thereof.

Figure 3:
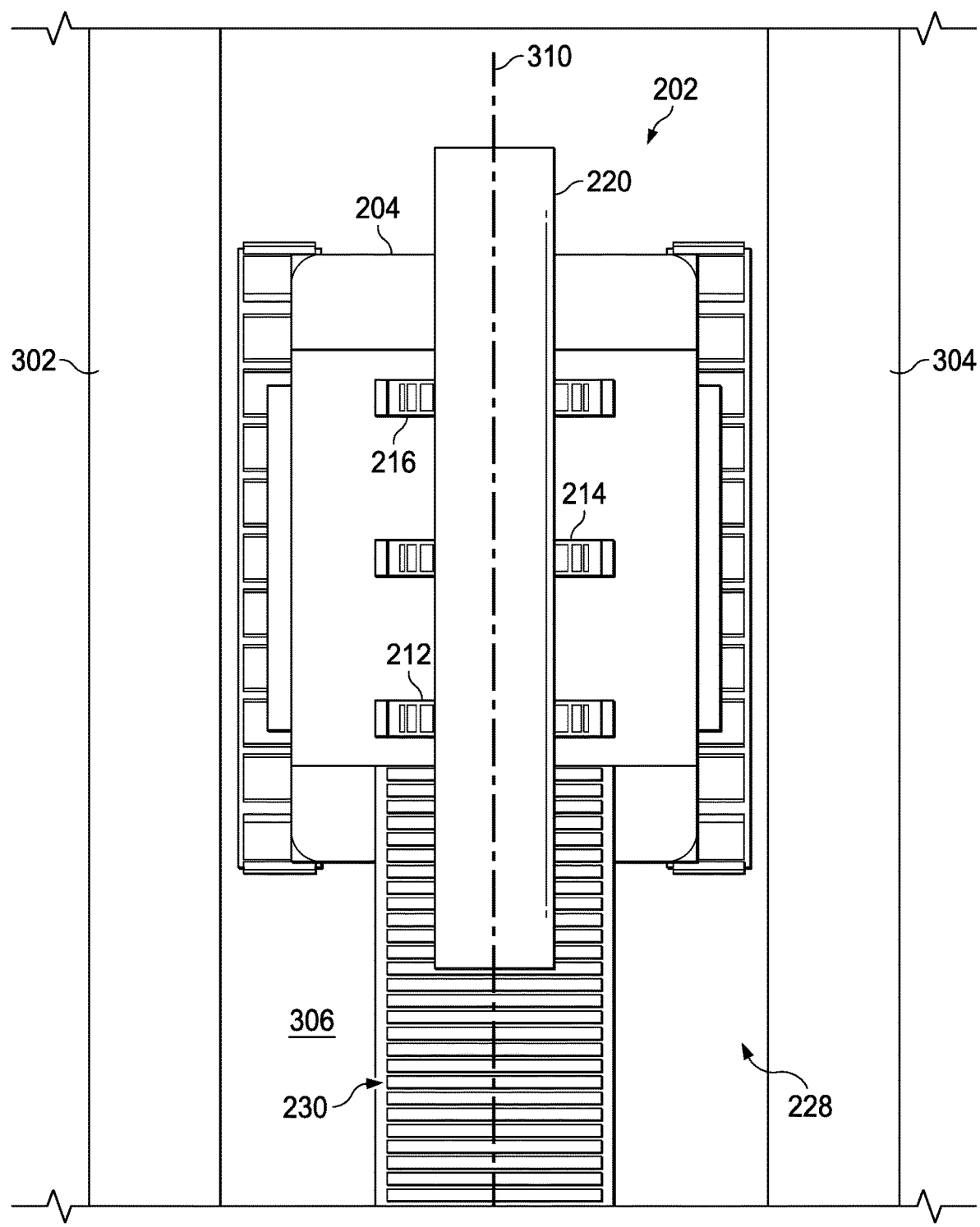
FIG. 3 is an illustration of a top view of a pipe laying apparatus in a ditch in accordance with an illustrative example.

With reference next to FIG. 3 and FIG. 4, illustrations of pipe laying apparatus 202 in ditch 228 from a top and an end view, respectively, are depicted in accordance with an illustrative example. In the illustrative examples, the same reference numeral may be used in more than one figure. This reuse of a reference numeral in different figures represents the same element in the different figures.

Pipe laying apparatus 202 is positioned in ditch 228. Ditch 228 includes bank 302 opposite bank 304. Bank 302 and bank 304 flank floor 306 of ditch 228. Mobile platform 204 drives on track 226 on floor 306 of ditch 228 within ditch 228 between bank 302 and bank 304. Mobile platform 204 carries pipe segment 220 within ditch 228. Mobile platform 204 transports pipe segment 220 along floor 306 of ditch 228 to a desired location within ditch 228. Cradles 212, 214, 216 attached to supports 206, 208, 210, respectively, support weight 221 of pipe segment 220. The cradles, while supporting weight 221 of pipe segment 220 align weight 221 of pipe segment 220 with longitudinal central axis 310 of mobile platform 204. Because mobile platform 204, with the use of the cradles, supports the weight of pipe segment 220 in alignment with longitudinal central axis 310 of mobile platform 204, mobile platform 204 can safely transport pipe segment 220 within ditch 228 and offload pipe segment 220 from mobile platform 204 at a desired location within ditch 228 without the chance of tipping over sideways in the ditch. In other words, mobile platform 204 holds pipe segment 220 within the cradles which align the weight of the pipe segment with the longitudinal central axis of mobile platform 204. As a result, as mobile platform 204 transports pipe segment 220 through ditch 228, the possibility of mobile platform and the carried pipe segment to tip over is eliminated. Level sensor 218 senses the horizontal position of mobile platform 204 as mobile platform 204 traverses the ground. If the ground is uneven, level sensor 218 can send signals to supports 206, 208, 210 to adjust the extension length of each support such that a pipe segment supported by the cradles on the supports stays horizontally level despite any uneven terrain that the mobile platform may be traversing.

Figure 5:
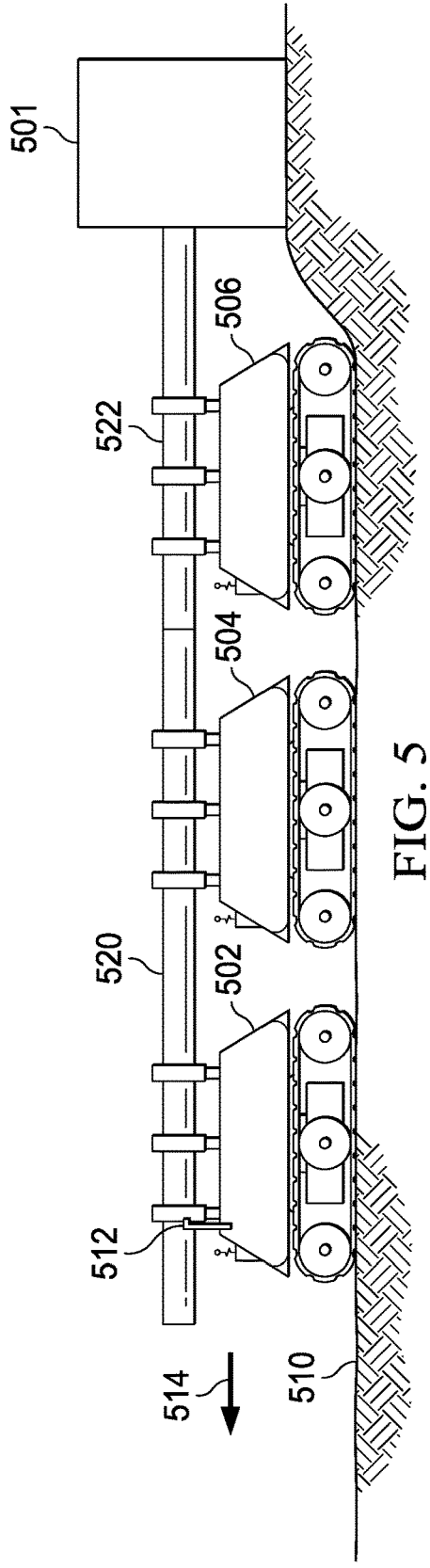
FIG. 5 is an illustration of serially aligned mobile platforms in accordance with an illustrative example.
Figure 6:
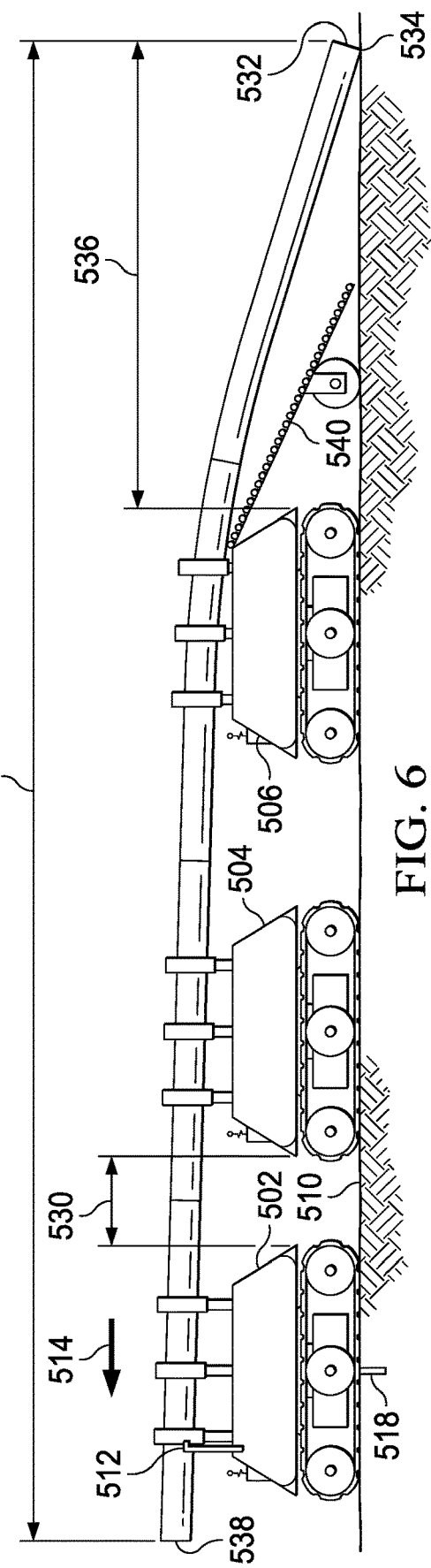
FIG. 6 is an illustration of serially aligned mobile platforms in accordance with an illustrative example.

With reference next to FIG. 5 and FIG. 6, illustrations of a plurality of mobile platforms arranged serially in a ditch is depicted in accordance with an illustrative example. These illustrations are examples of physical implementations for plurality of mobile platforms 120 shown in block form in FIG. 1. In applications for laying lengthy pipelines, multiple mobile platforms can be employed in a line within the ditch the pipeline is to be installed. Each mobile platform can hold a pipe segment, or joined pipe segments, for a section of the pipeline. The pipe segments or joined pipe segments can be fed to the first mobile platform in the line of mobile platforms from pipe delivery equipment.

For example, pipe delivery equipment 501 can prepare or assemble pipe segments or joined pipe segments. An example of pipe delivery equipment 501 can be a pipe laying tensioner machine. In this illustrated example, pipe delivery equipment 501 feeds pipe segments 520 and 522 to mobile platforms 502, 504, 506 arranged serially in ditch 510. The mobile platforms 502, 504, 506 are positioned in a line relative to each other such that the central longitudinal axes of each are collinear.

Pipe segments 520 and 522 can be joined together by pipe delivery equipment 501 such that they are fed to the mobile platforms as a single unit or they may be fed to the mobile platforms separately. Each mobile platform 502, 504, 506 supports the pipe segments as they are delivered by pipe delivery equipment 501. Although three mobile platforms are depicted, the number of mobile platforms is determined by the number of pipe segments or the length of joined pipe segments delivered by pipe delivery equipment 501, the dimensions of the pipe segments, and the intended use of the pipeline. Additional or fewer mobile platforms can be used. An adequate number of mobile platforms is used to ensure that the joined pipe segments do not sag between mobile platforms or are otherwise not damaged during transportation from the pipe laying equipment to a desired location in the ditch.

In this illustrated example, pipe segment 520 is fed from pipe delivery equipment 501 to mobile platform 506. Pipe segment 520 and any other pipe segments that follow pipe segment 520 (which may be joined to pipe segment 520, such as pipe segment 522) are sequentially fed to mobile platform 506. Mobile platform 506 receives pipe segment 520 in the cradles of mobile platform 506. Because the cradles include a low-friction surface, each pipe segment moves through the cradles of mobile platform 506 as pipe delivery equipment 501 feeds the pipe segments to mobile platform 506. The cradles are configured to support the pipe segments and align a weight of the pipe segments with the longitudinal central axis of each mobile platform in the series of aligned mobile platforms. At no time is the weight of the pipe segments not aligned with the central longitudinal axis of the mobile platform supporting it. Because the supports that extend from mobile platform 506 are extendable, the cradles of mobile platform 506 can be raised or lowered to a height that accommodates the delivery of the pipe segments from pipe delivery equipment 501. After pipe segment 520 passes through the cradles of mobile platform 506, the cradles of mobile platform 504 receive pipe segment 520. The passing of the pipe segments from one mobile platform in the serial line of mobile platforms to the next mobile platform continues until the last mobile platform is reached, in this illustrated example, mobile platform 502. Once pipe segment 520 reaches mobile platform 502, brake 512 is engaged such that pipe segment 520 no longer freely passes through the cradles of mobile platform 502. Once brake 512 is engaged, pipe segment 520 is fixed relative to mobile platform 502.

Pipe delivery equipment 501 continues to feed pipe segments or joined pipe segments to mobile platform 506 until a desired length of a pipe segment or joined pipe segments, for example, length 516 is reached. As pipe delivery equipment 501 continues to feed pipe segments to mobile platform 506, mobile platform 502, with brake 512 engaged, begins to move in direction 514 within ditch 510. Mobile platform 502 continues to move in direction 514 until a precalculated distance, for example, distance 530, is reached between mobile platform 502 and mobile platform 504. Distance 530 is calculated to prevent sag in the transported pipe segments that may damage the pipe segments.

Once distance 530 is reached, mobile platform 504 begins to move in direction 514 at the same pace as mobile platform 502 to maintain distance 530 between them. The distance mobile platform 502 travels, as well as the rest of the mobile platforms in the series, for example, mobile platforms 504, 506 depends on the number of or length of pipe segments to be placed in the ditch. Pipe delivery equipment 501 will feed pipe segments to the mobile platforms until length 516 is reached.

Mobile platform 502 and mobile platform 504 and mobile platform 506 transport length 516 of pipe segments until mobile platform 502 reaches stop position 518. When mobile platform 502 reaches stop position 518, all the serially aligned mobile platforms stop. At stop position 518, end 532 of the entirety of length 516, whether it is one long pipe segment, or several pipe segments joined together, is positioned at location 534 in the ditch. Location 534 is the location in the ditch where end 532 is to be placed. Distance 536 is the distance between location 534 and the last mobile platform in the series of mobile platforms, in this illustrated example, mobile platform 506. Distance 536 is calculated to accommodate an acceptable amount of sag that will not damage the pipe segments but also allows end 532 to contact ditch 510 at location 534.

Once end 532 contacts ditch 510 at location 534, offloading the pipe segments from the mobile platforms can begin. During offloading, the weight of the pipe segments remains aligned with the central longitudinal axes of the serially aligned mobile platforms. To offload the pipe segments from the serially aligned mobile platforms, brake 512 is released and all the serially aligned mobile platforms, in this illustrated example, mobile platforms 502, 504, 506 begin to move in direction 514 again. Because end 532 is grounded in ditch 510 at location 534, as mobile platforms 502, 504, 506 move in direction 514, the mobile platforms move through the ditch while the entirety of length 516 of the pipe segments remains stationary relative to the ditch. The low-friction surfaces of the cradles allow the mobile platforms to move while the pipe segments remain stationary. End 532 can be mechanically fixed to ditch 510 at location 534 to ensure no movement of the pipe segments relative to the ditch while the mobile platforms move out from under the pipe segments.

End 538 of the pipe segments is opposite end 532. Once mobile platform 506 reaches end 538, end 538 travels down ramp 540 until end 538 contacts ditch 510. As pipe segments reach ramp 540, the supports on each mobile platform can be lowered so that the transition from the last cradle to ramp 540 is at an equal elevation. In this manner the entirety of length 516 of the pipe segments pipe is placed in the ditch without damage to the pipe segments and without the possibility of the mobile platforms tipping over sideways because of the weight of the pipe segments as the weight of the pipe segments is always aligned with the central longitudinal axes of the mobile platforms.

Figure 7:
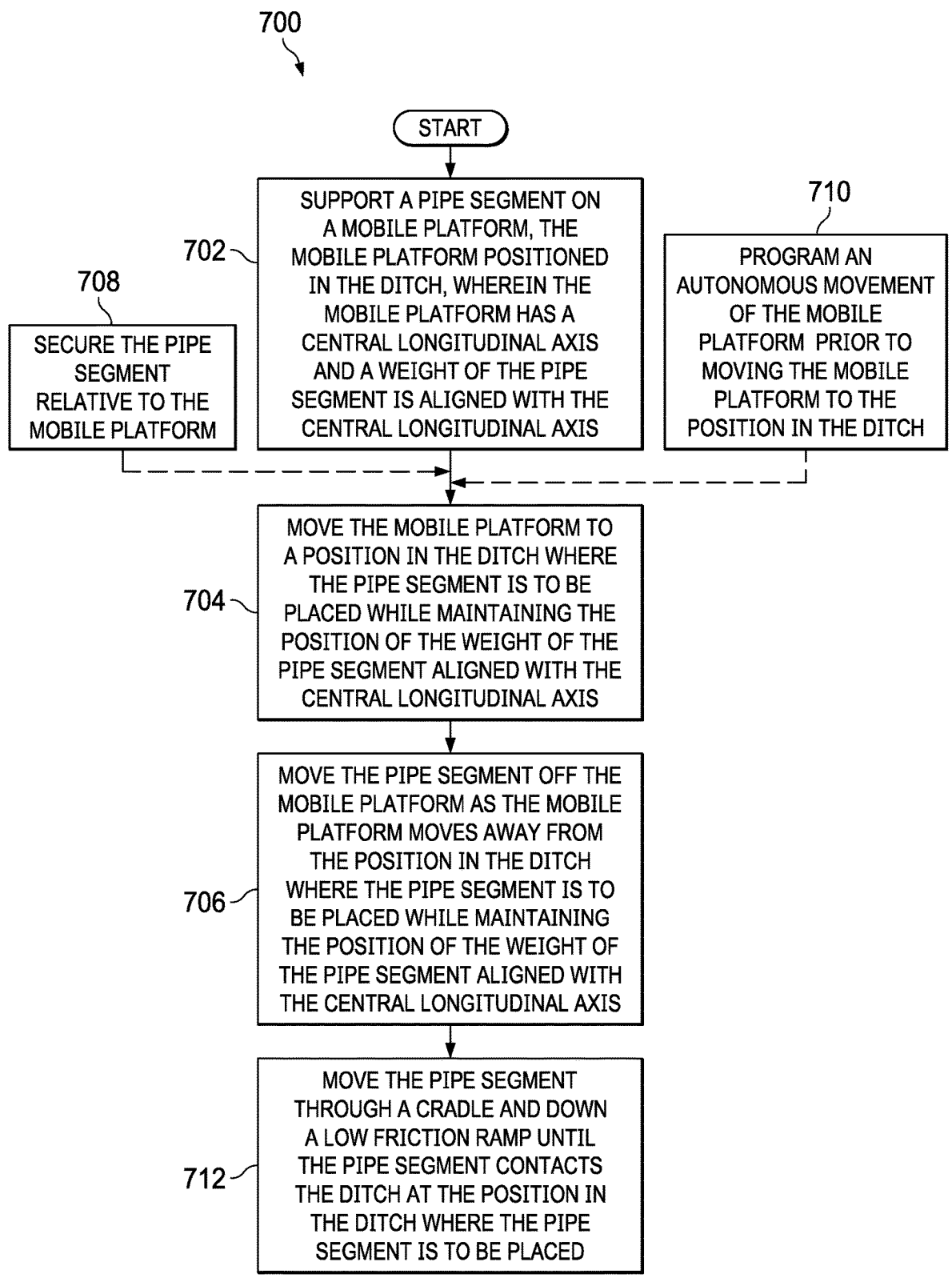
FIG. 7 is an illustration of a flowchart of a process for laying pipe segments in a ditch in accordance with an illustrative example.

With reference now to FIG. 7, an illustration of a flowchart of a process 700 for laying pipe segments in a ditch is depicted in accordance with an illustrative embodiment. The method depicted in FIG. 7 may be used in conjunction with the pipe laying apparatus depicted in FIGS. 1-6 and FIGS. 8-11.

The process begins by supporting a pipe segment on a mobile platform. The mobile platform is positioned in the ditch and has a central longitudinal axis. The weight of the pipe segment is aligned with the central longitudinal axis (operation 702). The process moves the mobile platform to a position in the ditch where the pipe segment is to be placed while maintaining the position of the weight of the pipe segment aligned with the central longitudinal axis (operation 704). Alternatively, the process can move the mobile platform to a position over the ditch where the pipe segment is to be placed while maintaining the position of the weight of the pipe segment aligned with the central longitudinal axis. At operation 706, the process moves the pipe segment off the mobile platform as the mobile platform moves away from the position in the ditch where the pipe segment is to be placed while maintaining the position of the weight of the pipe segment aligned with the central longitudinal axis. At operation 708, the process secures the pipe segment relative to the mobile platform. Typically, but not necessarily, the pipe segment is secured relative to the mobile platform prior to moving the mobile platform to the position in the ditch or over the ditch so that the pipe segment does not disengage from the mobile platform before reaching its destination. At operation 710, the process can program an autonomous movement of the mobile platform. Typically, but not necessarily, programming the autonomous movement of the mobile platform occurs prior to or during moving the mobile platform to the position in the ditch or over the ditch so that the movement of the mobile platform or a plurality of mobile platforms can be coordinated based on size and weight of the pipe segment, length and depth of the ditch, or number of mobile platforms in use. At operation 712, the process moves the pipe segment through the cradle and down a low-friction ramp until the pipe segment contacts the ditch at the position in the ditch where the pipe segment is to be placed In some alternative implementations of an illustrative example, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 8:
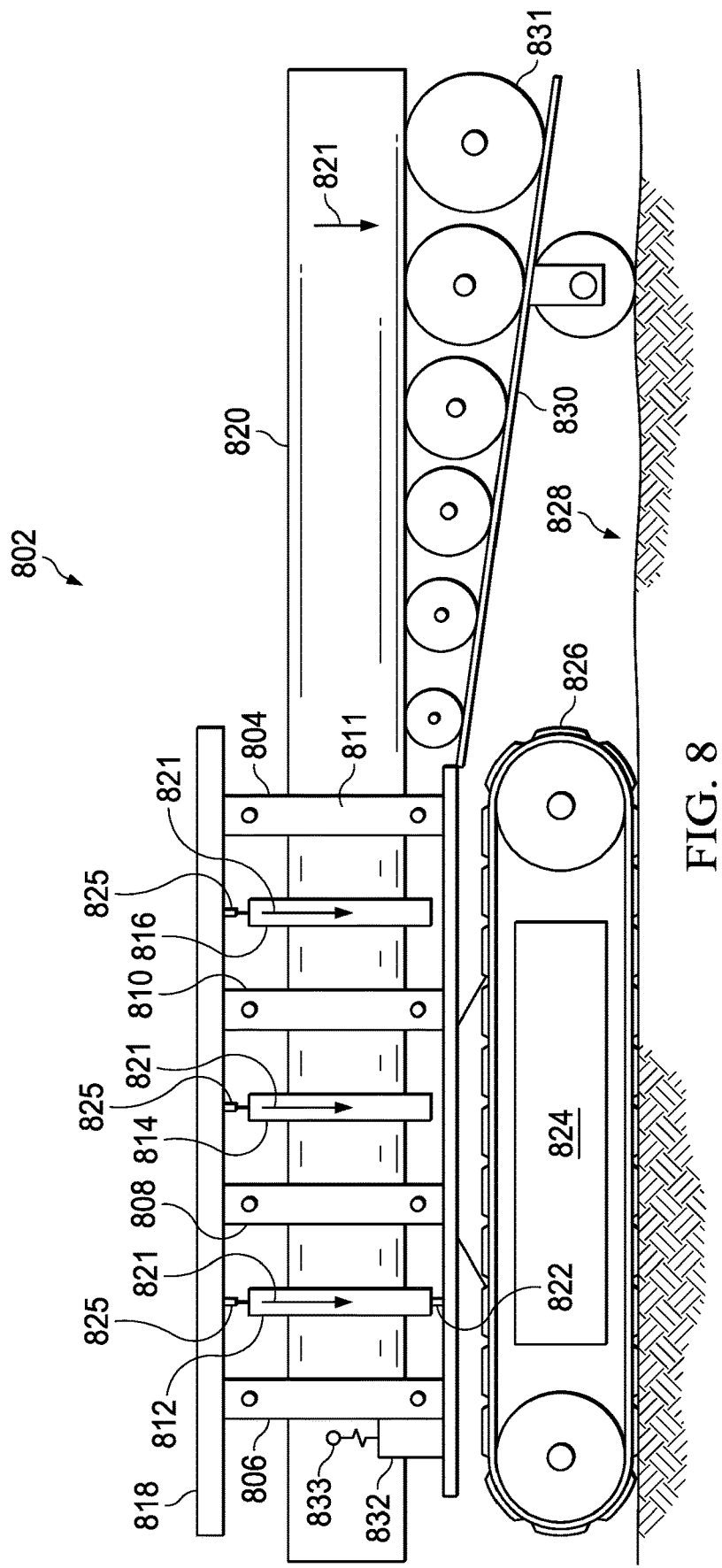
FIG. 8 is an illustration of a side view of a pipe laying apparatus in a ditch in accordance with an illustrative example.
Figure 9:
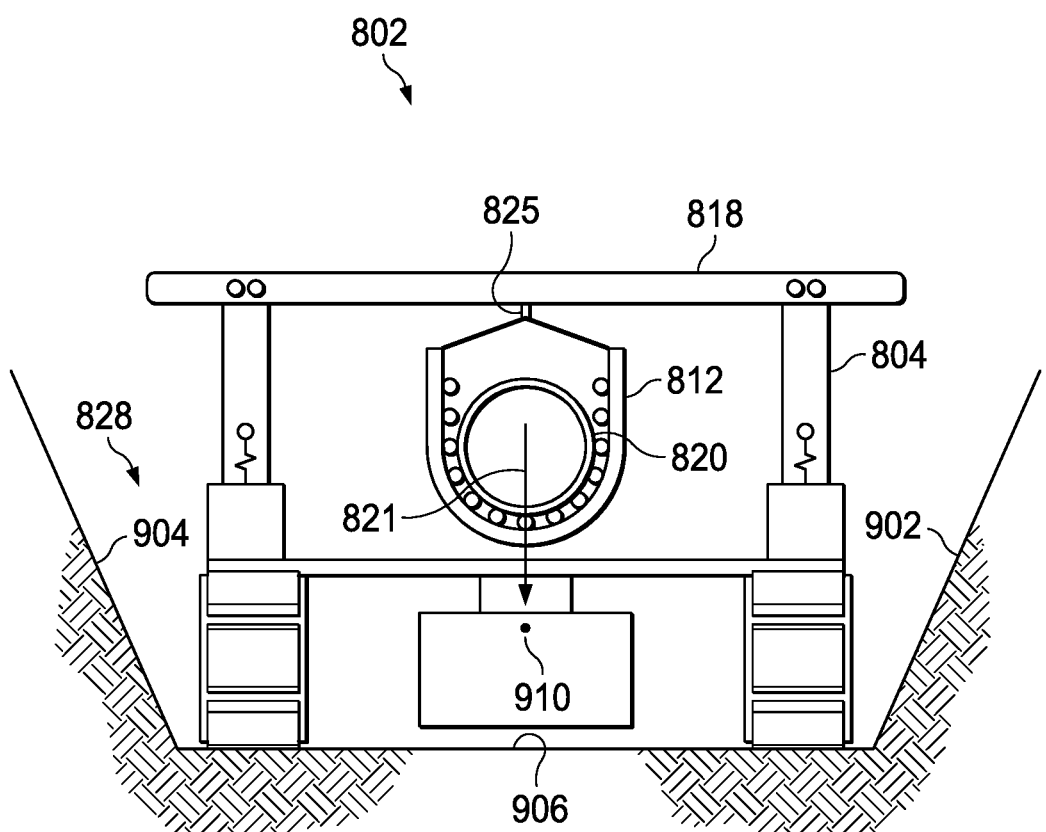
FIG. 9 is an illustration of an end view of a pipe laying apparatus in a ditch in accordance with an illustrative example.

With reference next to FIG. 8 and FIG. 9, illustrations of pipe laying apparatus 802 in ditch 828 from a side and end view, respectively, are depicted in accordance with an illustrative example. In this illustrative example, pipe laying apparatus 802 is an example of one implementation for pipe laying apparatus 102 shown in block form in FIG. 1. In the illustrative examples, the same reference numeral may be used in more than one figure. This reuse of a reference numeral in different figures represents the same element in the different figures.

As depicted, pipe laying apparatus 802 includes mobile platform 804. Support 806, support 808, support 810, and support 811 extend from mobile platform 804. Gantry 818 is attached to supports 806, 808, 810, 811. Cradle 812 hangs from gantry 818 between supports 806, 808. Cradle 814 hangs from gantry 818 between supports 808, 810. Cradle 816 hangs from gantry 818 between supports 810, 811. As depicted, four separate supports are shown. It is understood that additional or fewer supports/cradles could be utilized with adequate success. Each support is extensible. The cradles can extend or hang from the gantry via connectors 825. Connectors 825 can be flexible, for example, rope, chain, or straps so that each cradle may tend to swing with movement of the mobile platform. In other examples, the cradles can extend from the gantry via connectors 825 that are rigid such as pipe or braces such that the cradles are connected to the gantry rigidly. A rigid connector between a cradle and the gantry braces the cradle and prevents movement of the cradle relative to the gantry.

Because the gantry from which the cradles hang is attached to the distal end of the supports, the distance of the cradle from the mobile platform 804 is adjustable. The cradles, for example, cradle 812, cradle 814, and cradle 816 support pipe segment 820. In other words, mobile platform 804 supports weight 821 of pipe segment 820. Weight 821 is represented in FIGS. 8 and 9 with arrows. Each cradle can be, for example, a flexible sling that conforms to the generally cylindrical shape of pipe segment 820.

Each cradle can include a low-friction surface such as rollers or lubrication in order to facilitate movement of pipe segment 820 through each cradle. As a result, pipe segment 820 is free to move relative to the cradles and mobile platform 804 unless restrained in some manner. Brake 822 attached to mobile platform 804 and/or at least one of the cradles secures pipe segment 820 relative to mobile platform 804. When brake 822 is engaged, pipe segment 820 is no longer free to move relative to the cradles or mobile platform 804.

Engine 824 and track 826 combine to provide mobility for mobile platform 804. Engine 824 provides power for track 826. Track contacts ditch 828. Engine 824 can be powered by diesel fuel, gasoline, hydrogen, other green fuels, electrical batteries, etc. or any combination thereof. Track 826 can be replaced with a set of wheels or skids or any combination thereof.

Ramp 830 is attached to mobile platform 804. Ramp 830 extends from mobile platform 804 to a floor of ditch 828. Ramp 830 includes low-friction surface 831. Low-friction surface 831 of ramp 830 can be a lubricated surface or, for example, may include rollers, slides, etc. For example, rollers may include ball bearings or cylindrical shaped rollers. Cylindrical shaped rollers can have a diameter in the range of, for example, 1 to 12 inches. Larger or smaller diameters are also contemplated. The rollers may increase in diameter the further each roller is spaced from mobile platform 804. As a result, as pipe segment 820 is offloaded from mobile platform 804, pipe segment 820 remains generally horizontally oriented. Ramp 830 and low-friction surface 831 provide spacing for a separate tractor with a cradle or sling to support the pipe segment off the mobile platform. The tractor with the cradle or sling can then lower the end of the pipe segment to the floor of the ditch. Ramp 830 can also include a wheel attached to the underside of ramp 830. The wheel supports the weight of the ramp and a pipe segment should a pipe segment be in the process of offloading from the mobile platform. The wheel may include a wiper. The wiper would rub the wheel to remove mud, clay, or dirt that could possibly collect on the wheel.

Controller 832, mounted on or within mobile platform 804, is in electrical communication with mobile platform 804. Controller 832 can be programmed by a user through the use of a remote computer or direct wired computer. The operation of mobile platform 804, engine 824, supports 806, 808, 810, 811, and brake 822 can be managed by controller 832. To manage the aforementioned components means to send signals from a processor to servos or other mechanical components to effect movement in the mobile platform 804, engine 824, supports 806, 808, 810, 811, and brake 822. Through controller 832, mobile platform 804 can be remote controlled and the movement of mobile platform 804 can be programmable. In an illustrative example, controller 832 can be programmed to position mobile platform 804 or each mobile platform of a plurality of mobile platforms according to specific parameters of ditch 828 and pipe segment 820. For example, each mobile platform can be programmed to move into position based on size and weight of pipe segment 820, length and depth of ditch 828, or number of mobile platforms in use in the ditch. The position of mobile platform 804 relative to another mobile platform during operation of laying pipe segments in the ditch is important in order to control sag of the pipe segments being transported and to prevent damage to the pipe segments.

Controller 832 includes antenna 833 which can enable a user to drive each mobile platform with a remote controller. Controller 832 can be implemented, for example, as custom circuitry, as a hardware processor executing programmed instructions, or some combination thereof.

Pipe laying apparatus 802 is positioned in ditch 828. Ditch 828 includes bank 902 opposite bank 904. Bank 902 and bank 904 flank floor 906 of ditch 828. Mobile platform 804 drives on track 826 on floor 906 of ditch 828 within ditch 828 between bank 902 and bank 904. Mobile platform 804 carries pipe segment 820 within ditch 828. Mobile platform 804 transports pipe segment 820 along floor 906 of ditch 828 to a desired location within ditch 828. Cradles 812, 814, 816 hanging from gantry 818 support weight 821 of pipe segment 820. The cradles, while supporting weight 821 of pipe segment 820 align weight 821 of pipe segment 820 with longitudinal central axis 910 of mobile platform 804. Because mobile platform 804, with the use of the cradles, supports the weight of pipe segment 820 in alignment with longitudinal central axis 910 of mobile platform 804, mobile platform 804 can safely transport pipe segment 820 within ditch 828 and offload pipe segment 820 from mobile platform 804 at a desired location within ditch 828 without the chance of tipping over sideways in the ditch. In other words, mobile platform 804 holds pipe segment 820 within the cradles which align the weight of the pipe segment with the longitudinal central axis of mobile platform 804. As a result, as mobile platform 804 transports pipe segment 820 through ditch 828, the possibility of mobile platform and the carried pipe segment to tip over is eliminated.

Figure 10:
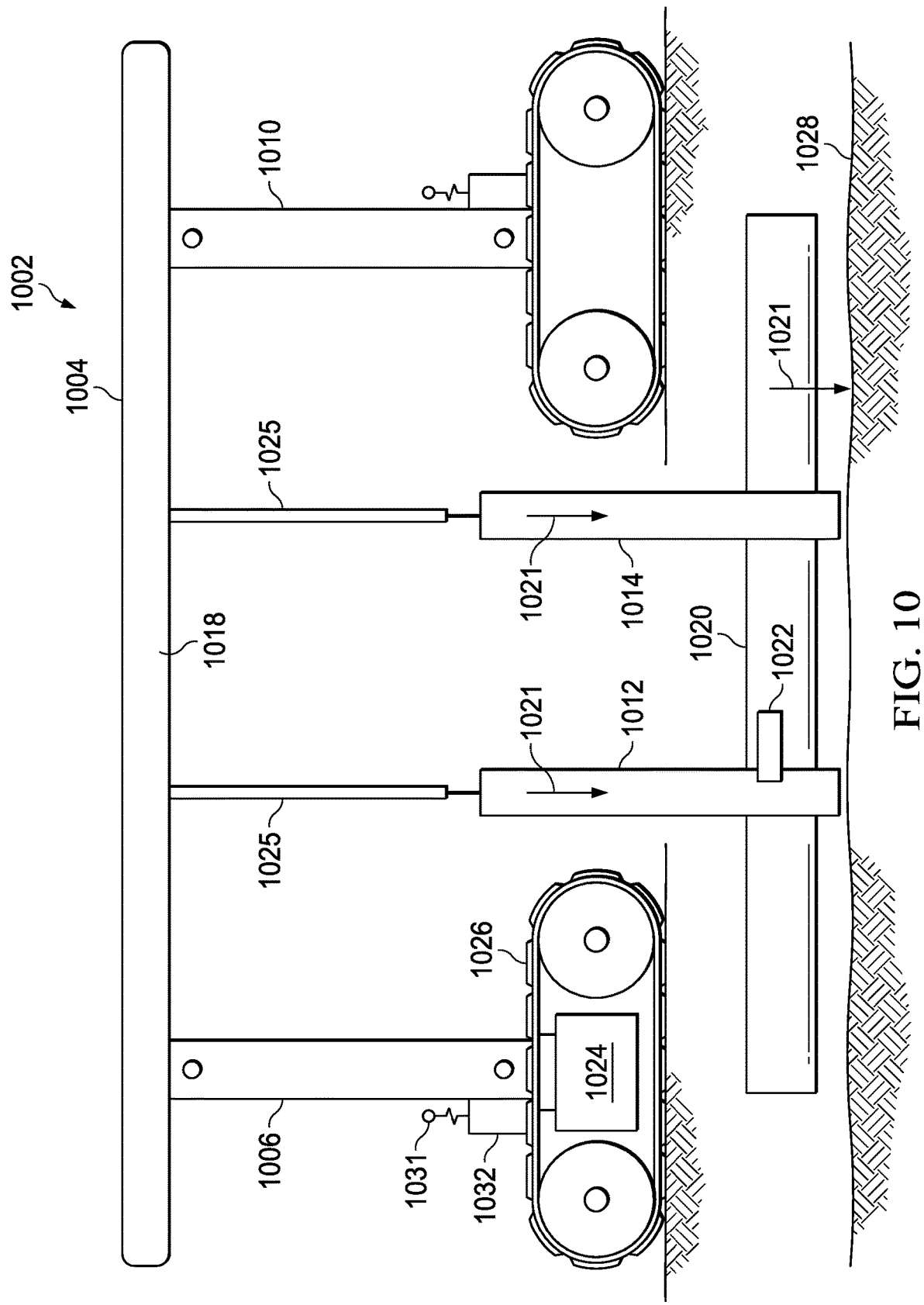
FIG. 10 is an illustration of a side view of a pipe laying apparatus over a ditch in accordance with an illustrative example.
Figure 11:
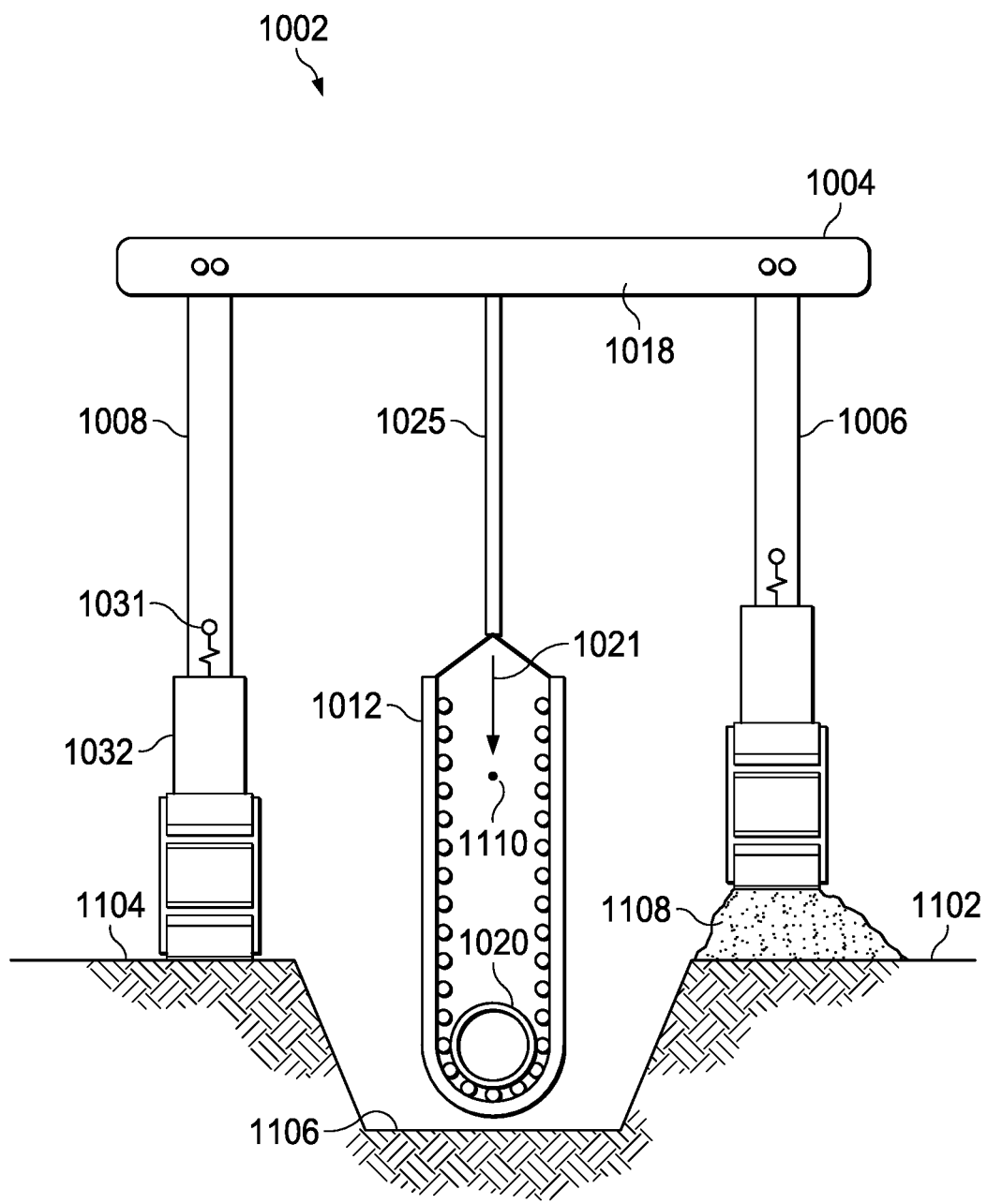
FIG. 11 is an illustration of an end view of a pipe laying apparatus over a ditch in accordance with an illustrative example.

With reference next to FIG. 10 and FIG. 11, illustrations of pipe laying apparatus 1002 straddling ditch 1028 and transporting a pipe segment over a ditch from a side view and an end view, respectively, are depicted in accordance with an illustrative example. In this illustrative example, pipe laying apparatus 1002 is an example of one implementation for pipe laying apparatus 102 shown in block form in FIG. 1. In the illustrative examples, the same reference numeral may be used in more than one figure. This reuse of a reference numeral in different figures represents the same element in the different figures. Pipe laying apparatus 1002 illustrated in FIGS. 10-11 may be used in conjunction with pipe laying apparatus 202 illustrated in FIGS. 2-4 and pipe laying apparatus 802 illustrated in FIGS. 8-9 to perform process 700 of FIG. 7.

As depicted, pipe laying apparatus 1002 includes mobile platform 1004. Support 1006, support 1008, support 1010, and support 1011 (not shown) extending from mobile platform 1004. Gantry 1018 is attached to supports 1006, 1008, 1010, 1011. Both cradle 1012 and cradle 1014 hang from gantry 1018 between supports 1006, 1008 and supports 1010, 1011. Each support is extensible. Because the gantry from which the cradles hang is attached to the distal end of the supports, the distance the cradle hangs from the mobile platform 804 is adjustable. The cradles can extend or hang from the gantry via connectors 1025. Connectors 1025 can be flexible, for example, rope, chain, or straps so that each cradle may tend to swing with movement of the mobile platform. In other examples, the cradles can extend from the gantry via connectors 1025 that are rigid such as pipe or braces such that the cradles are connected to the gantry rigidly. A rigid connector between a cradle and the gantry braces the cradle and prevents movement of the cradle relative to the gantry.

The cradles, for example, cradle 1012 and cradle 1014 support pipe segment 1020. In other words, mobile platform 1004 supports weight 1021 of pipe segment 1020. Weight 1021 is represented in FIGS. 10 and 11 with arrows. Each cradle may be, for example, a flexible sling that conforms to the generally cylindrical shape of pipe segment 1020.

Each cradle can include a low-friction surface such as rollers or lubrication in order to facilitate movement of pipe segment 1020 through each cradle. As a result, pipe segment 1020 is free to move relative to the cradles and mobile platform 1004 unless restrained in some manner. Brake 1022 attached to mobile platform 1004 and/or at least one of the cradles secures pipe segment 1020 relative to mobile platform 1004. When brake 1022 is engaged, pipe segment 1020 is no longer free to move relative to the cradles or mobile platform 1004.

Engine 1024 and track 1026 combine to provide mobility for mobile platform 1004. Engine 1024 provides power for track 1026. Mobile platform 1004 straddles ditch 1028. Track 1026 contacts bank 1102 and bank 1104 on opposites of ditch 1028.

Controller 1032, mounted on or within mobile platform 1004, is in electrical communication with mobile platform 1004. Controller 1032 can be programmed by a user through the use of a remote computer or direct wired computer. The operation of the mechanical components of mobile platform 1004 be managed by controller 1032. To manage the aforementioned components means to send signals from a processor to servos or other mechanical components to effect movement in the mobile platform 1004. Through controller 1032, mobile platform 1004 can be remote controlled and the movement of mobile platform 1004 can be programmable. In an illustrative example, controller 1032 can be programmed to position mobile platform 1004 or each mobile platform of a plurality of mobile platforms according to specific parameters of ditch 1028, bank 1102, bank 1104, and pipe segment 1020. For example, each mobile platform can be programmed to move into position based on size and weight of pipe segment 1020, length and depth of ditch 1028, or number of mobile platforms in use in the ditch. The position of mobile platform 1004 relative to another mobile platform during operation of laying pipe segments in the ditch is important in order to control sag of the pipe segments being transported and to prevent damage to the pipe segments.

Controller 1032 includes antenna 1031 which may enable a user to drive each mobile platform with a remote controller. Controller 1032 can be implemented, for example, as custom circuitry, as a hardware processor executing programmed instructions, or some combination thereof.

Ditch 1028 includes bank 1102 opposite bank 1104. Bank 1102 and bank 1104 flank floor 1106 of ditch 1028. After ditch 1028 is cut, a pile of dirt, for example, dirt 1108 will typically be positioned on either bank 1102 or bank 1104. Pipe laying apparatus 1002 straddles ditch 1028. Mobile platform 1004 drives on track 1026 on bank 1102 and bank 1104. If necessary, because the supports are extensible, supports on either side of the mobile platform can be retracted or extended to accommodate dirt 1108 and keep gantry 1018 relatively level. Adjusting the length of the supports adjusts the height of track relative to the banks of the ditch.

Mobile platform 1004 carries pipe segment 1020 within cradles 1012, 1014. Mobile platform 1004 transports pipe segment 1020 supported by cradles 1012, 1014, where pipe segment 1020 hangs in the cradles above floor 1106 of ditch 1028, to a desired location within ditch 1028. Cradles 1012, 1014, hanging from gantry 1018 support weight 1021 of pipe segment 1020. The cradles, while supporting weight 1021 of pipe segment 1020 align weight 1021 of pipe segment 1020 with longitudinal central axis 1110 of mobile platform 1004. Because mobile platform 1004, with the use of the cradles, supports the weight of pipe segment 1020 in alignment with longitudinal central axis 1110 of mobile platform 1004, mobile platform 1004 can safely transport pipe segment 1020 through ditch 1028 and offload pipe segment 1020 from mobile platform 1004 at a desired location within ditch 1028 without the chance of tipping over sideways in the ditch. In other words, mobile platform 1004 holds pipe segment 1020 within the cradles which align the weight of the pipe segment with the longitudinal central axis of mobile platform 1004. As a result, as mobile platform 1004 transports pipe segment 1020 through ditch 1028, the possibility of mobile platform and the carried pipe segment to tip over is eliminated.

Figure 12:
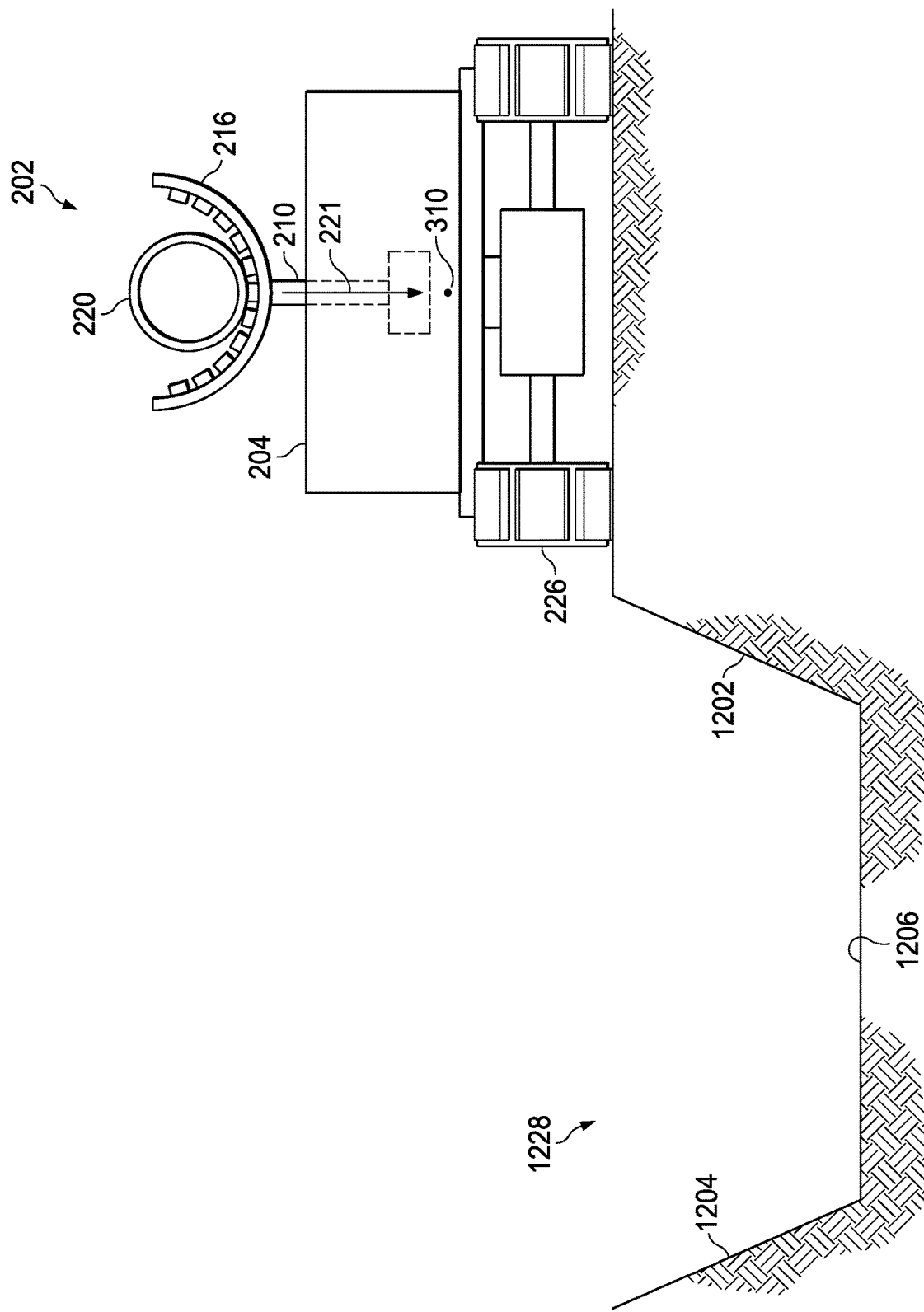
FIG. 12 is an illustration of an end view of a pipe laying apparatus beside a ditch in accordance with an illustrative example.

With reference next to FIG. 12, an illustration of pipe laying apparatus 202 on bank 1202 beside ditch 1228 from an end view is depicted in accordance with an illustrative example. In this illustrative example, pipe laying apparatus 202 is an example of one implementation for pipe laying apparatus 102 shown in block form in FIG. 1. In the illustrative example, the same reference numeral may be used in more than one figure. This reuse of a reference numeral in different figures represents the same element in the different figures.

As depicted in FIG. 12, pipe laying apparatus 202, as illustrated in FIGS. 2-4, may be replaced by, or may be used in conjunction with, pipe laying apparatus 802 illustrated in FIGS. 8-9 to perform process 700 of FIG. 7.

Ditch 1228 includes bank 1202 opposite bank 1204. Bank 1202 and bank 1204 flank floor 1206 of ditch 1228. Pipe laying apparatus 202 is positioned beside ditch 1228 on bank 1202 or bank 1204. As illustrated, mobile platform 204 drives on track 226 on bank 1202 beside ditch 1228. Alternatively, with equal success, mobile platform 204 can drive on bank 1204 beside ditch 1228. The specific terrain of each bank or the position of the dirt removed from the ditch to create the ditch may factor into which bank mobile platform 204 drives on. Mobile platform 204 carries pipe segment 220 on bank 1202 beside ditch 1228. Mobile platform 204 transports pipe segment 220 beside ditch 1228 to a desired location along ditch 1228. At least one cradle, for example, cradle 216 attached to support 210, supports weight 221 of pipe segment 220. The cradle, or multiple cradles, while supporting weight 221 of pipe segment 220, align weight 221 of pipe segment 220 with longitudinal central axis 310 of mobile platform 204. Because mobile platform 204, with the use of the cradles, supports the weight of pipe segment 220 in alignment with longitudinal central axis 310 of mobile platform 204, mobile platform 204 can safely transport pipe segment 220 beside ditch 1228 on bank 1202 and offload pipe segment 220 from mobile platform 204 at a desired location within ditch 1228 without the chance of tipping over sideways in the ditch. In other words, mobile platform 204 holds pipe segment 220 within the cradles which align the weight of the pipe segment with the longitudinal central axis of mobile platform 204. As a result, as mobile platform 204 transports pipe segment 220 beside ditch 1228, the possibility of mobile platform and the carried pipe segment tipping over is eliminated.

Figure 13:
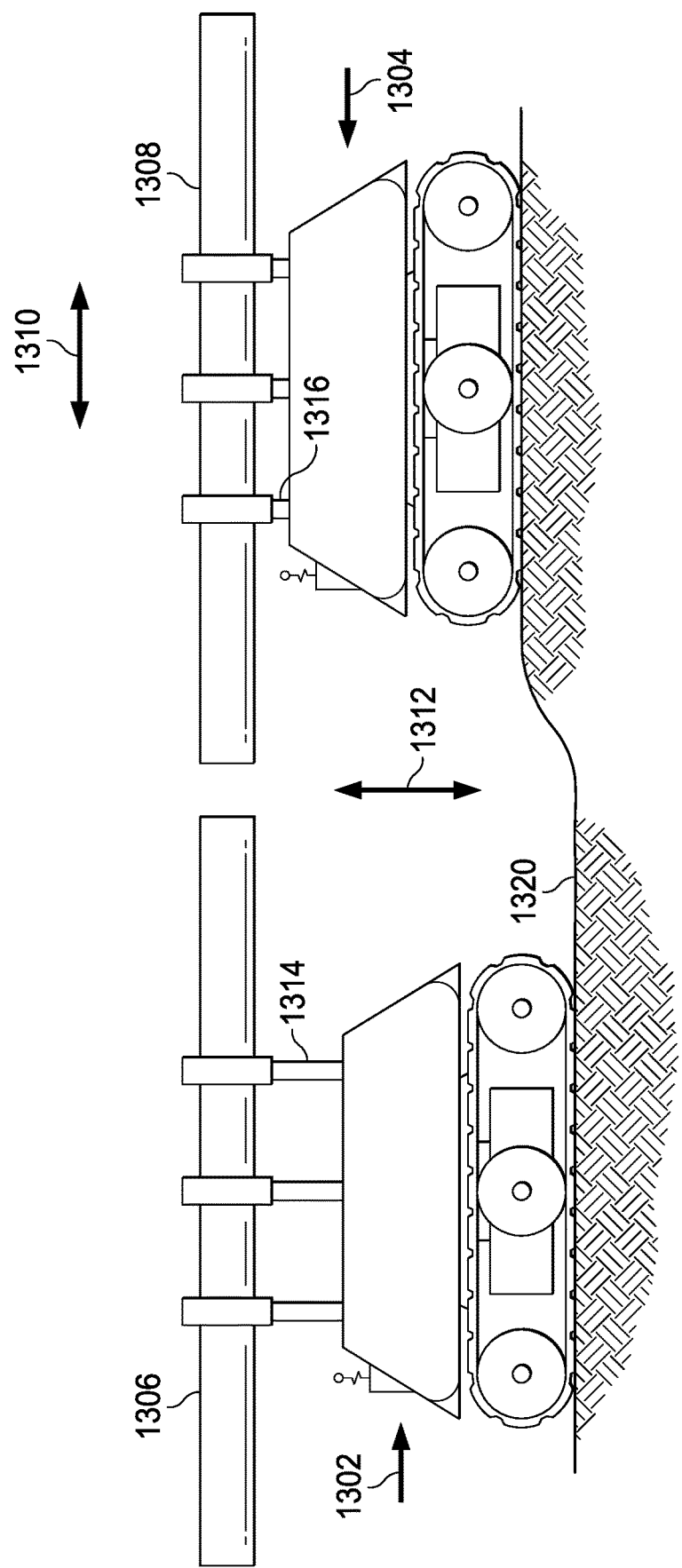
FIG. 13 is an illustration of a side view of pipe laying apparatus in replacement of skids in accordance with an illustrative example.

With reference next to FIG. 13, an illustration of pipe laying apparatus 1302 and pipe laying apparatus 1304 from a side view is depicted in accordance with an illustrative example. In this illustrative example, pipe laying apparatus 1302 and pipe laying apparatus 1304 are examples of one implementation for pipe laying apparatus 102 shown in block form in FIG. 1. In the illustrative example, the same reference numeral may be used in more than one figure. This reuse of a reference numeral in different figures represents the same element in the different figures.

Typically, if pipe delivery equipment 501, for example a tensioner, is not used, once pipe segments are delivered to a pipeline assembly site on delivery trucks, the pipe segments are transitioned from the delivery truck to skids to be assembled. The ends of adjacent pipe segments, where the pipe segments are supported on skids, are manually aligned such that they can be joined. A human skilled crew adjusts the height of each skid and the position of the pipe segment on each skid and thus is dangerously close in proximity to the large pipe segments. It is imperative that the ends of the pipe segments to be joined are in close enough proximity for the joint to be effectuated and it is equally imperative that the pipe segments to be joined remain longitudinally aligned so that the joined pipe segments are not crooked.

As depicted in FIG. 13, pipe laying apparatus 1302 and pipe laying apparatus 1304 can replace skids typically used to support pipe segments as the pipe segments are assembled. Pipe segment 1306 is supported on supports of pipe laying apparatus 1302 while pipe segment 1308 is supported on supports of pipe laying apparatus 1304. As previously described, pipe laying apparatus 1302 and pipe laying apparatus 1304 are mobile and can be programmed or remotely controlled to move essentially, laterally in direction 1310. Moving each in direction 1310 positions the ends of pipe segments 1306 and 1308 in proximity to each other to be joined and longitudinally aligns them. Supports 1314 of pipe laying apparatus 1302 are height adjustable. Supports 1316 of pipe laying apparatus 1304 are height adjustable. Supports 1316 and 1314 can adjust the respective heights of pipe segments 1306 and 1308 in direction 1312 relative to ground 1320. Because supports 1316 and 1314 can adjust the respective heights of pipe segments, pipe laying apparatus 1302 and pipe laying apparatus 1304 can align the pipe segments horizontally despite any uneven terrain that may be present. As a result, pipe laying apparatus 1302 and pipe laying apparatus 1304 provide for programmed or remote controlled movement and alignment of the pipe segments to be joined. Pipe laying apparatus 1302 and pipe laying apparatus 1304 used in this manner remove the necessity of having human skilled crew in harm's way and provides a safer environment for pipeline assembly, transportation, and installation. All through assembly, pipe laying apparatus 1302 and pipe laying apparatus 1304 maintain the position of the weight of the pipe segment that each support aligned with the central longitudinal axis of each pipe laying apparatus.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A pipe laying apparatus for laying a pipeline comprised of pipe segments, comprising:
   a mobile platform having a longitudinal central axis;
   a set of wheels or a tank track;
   an engine or motor configured to drive said set of wheels or a tank track;
   a support extending from the mobile platform;
   a gantry connected to the support extending from the mobile platform and said gantry extending at least in part above and over at least a part of said longitudinal central axis;
   a cradle attached to the gantry, the cradle configured to support a pipe segment of the pipe segments;
   a ramp attachable at said mobile platform;
   wherein said mobile platform receives said pipe segment into said cradle for transport of said pipe segment and wherein the pipe segment is free to move within the cradle relative to the support;

wherein the cradle is configured to align a weight of the pipe segment with the longitudinal central axis as the pipe laying apparatus transports the pipe segment to a location and maintain the position of the weight of the pipe segment aligned with the longitudinal central axis as the pipe laying apparatus offloads the pipe segment at the location, either to another mobile platform or down said ramp for laying the pipe segment.

2. The pipe laying apparatus of claim 1, wherein a length of the support is adjustable such that a height position of the cradle relative to the mobile platform is adjustable.

3. The pipe laying apparatus of claim 1, further comprising a programmable controller positioned on said mobile platform for controlling movement of said mobile platform.

4. The pipe laying apparatus of claim 1, wherein the cradle is a flexible sling.

5. The pipe laying apparatus of claim 1, wherein the location is a ditch having a first bank and a second bank on opposite sides of the ditch, and wherein the pipe laying apparatus contacts the first bank and the second bank and the mobile platform is configured to straddle the ditch from the first bank to the second bank.

6. The pipe laying apparatus of claim 1, further comprising a brake configured to fix a position of the pipe segment relative to the cradle.

7. A system for laying a pipeline in a ditch, the system comprising:
pipe delivery equipment configured to feed a pipe segment to a pipe laying apparatus, the pipe laying apparatus positioned in the ditch; and
the pipe laying apparatus comprising:
a mobile platform having a longitudinal central axis;
a set of wheels or a tank track;
an engine or motor configured to drive said set of wheels or a tank track;
a gantry extending at least in part above and over at least a part of said longitudinal central axis;
a plurality of supports extending from the mobile platform and connected to said gantry;
a cradle attached to each support of the plurality of supports;
wherein each said cradle is configured to support the pipe segment and align a weight of the pipe segment with the longitudinal central axis of the mobile platform; and
wherein the pipe laying apparatus is configured to transport the pipe segment to a location within the ditch and further configured to offload the pipe segment at said location while maintaining the position of the weight of the pipe segment aligned with the longitudinal central axis as the pipe laying apparatus offloads the pipe segment either to another mobile platform or into the ditch.

8. The system of claim 7, further comprising a plurality of mobile platforms positioned in series in the ditch wherein each longitudinal central axis of each mobile platform is aligned collinearly.

9. The system of claim 8, wherein each mobile platform of the plurality of mobile platforms is configured to be remote controlled.

10. The system of claim 8, wherein a movement of each mobile platform of the plurality of mobile platforms is programmable such that each mobile platform of the plurality of mobile platforms can move independent of each other.

11. The system of claim 7, further comprising a low-friction ramp attached to the mobile platform, the low-friction ramp extending to a floor of the ditch and configured to lower the pipe segment into the ditch as the pipe segment moves from the cradle and the mobile platform moves away from the location within the ditch.

12. The system of claim 7, wherein a length of each support of the plurality of supports is independently adjustable such that a height position of each respective cradle relative to the mobile platform is adjustable.

13. A method of laying pipe segments in a ditch, the method comprising:
supporting a pipe segment on the mobile platform of the pipe laying apparatus of claim 1, wherein the mobile platform has a central longitudinal axis and a weight of the pipe segment is aligned with the central longitudinal axis;
moving the mobile platform to a position where the pipe segment is to be placed while maintaining the position of the weight of the pipe segment aligned with the central longitudinal axis; and
moving the pipe segment off the mobile platform as the mobile platform moves away from the position where the pipe segment is to be placed while maintaining the position of the weight of the pipe segment aligned with the central longitudinal axis.

14. The method of claim 13, wherein prior to moving the mobile platform to the position where the pipe segment is to be placed, securing the pipe segment relative to the mobile platform.

15. The method of claim 13, further comprising programming an autonomous movement of the mobile platform prior to moving the mobile platform to the position where the pipe segment is to be placed.

16. The method of claim 13, wherein the mobile platform comprises a plurality of mobile platforms on a respective plurality of pipe laying apparatuses of claim 1 positioned in series in the ditch and wherein each longitudinal central axis of each mobile platform is aligned collinearly.

17. The method of claim 13, wherein moving the pipe segment off the mobile platform as the mobile platform moves away from the position where the pipe segment is to be placed comprises, moving the pipe segment through the cradle attached to the gantry connected to the support extending from said mobile platform and down the ramp attached to the mobile platform until the pipe segment contacts the ditch at the position in the ditch where the pipe segment is to be placed.

18. A pipe laying apparatus for laying a pipeline comprised of pipe segments for transporting oil, gas, or chemical derivatives of oil or gas, comprising:
a mobile platform having a longitudinal central axis;
a support extending from the mobile platform;
a gantry connected to the support extending from the mobile platform and said gantry extending over said longitudinal central axis;
a cradle attached to and underlying the gantry, the cradle configured to support a pipe segment of the pipe segments, wherein the cradle is configured to align a weight of the pipe segment with the longitudinal central axis as the pipe laying apparatus transports the pipe segment to a location and to maintain the position of the weight of the pipe segment aligned with the longitudinal central axis as the pipe laying apparatus offloads the pipe segment at the location;
a set of wheels or a tank track;

a fuel or battery powered engine or motor configured to drive the set of wheels or a tank track; and a programmable controller for controlling movement of the pipe laying apparatus.

19. A method of laying a pipeline in a ditch for transporting oil, gas, or chemical derivatives of oil or gas, the method comprising using a plurality of the pipe laying apparatus of claim 18 to each:

receive a pipe segment from a source of pipe segments;

support said pipe segment;

transport said pipe segment;

deliver said pipe segment to the location for laying the pipeline in said ditch; and offload said pipe segment at said location in said ditch to comprise the pipeline, and using a ramp to facilitate the placement of said pipe segment in the ditch.

\* \* \* \* \*